United States Patent [19]

Kruse et al.

[11] Patent Number: 4,786,790
[45] Date of Patent: Nov. 22, 1988

[54] DATA EXCHANGE SYSTEM WITH AUTHENTICATION CODE COMPARATOR

[75] Inventors: Dietrich Kruse; Albrecht Beutelspacher, both of Ottobrunn; Annette-Gabriele Kersten, Wiesbaden, all of Fed. Rep. of Germany

[73] Assignee: Siemens Aktiengesellschaft, Berlin and Munich, Fed. Rep. of Germany

[21] Appl. No.: 164,476

[22] Filed: Mar. 4, 1988

[30] Foreign Application Priority Data

Mar. 4, 1987 [DE] Fed. Rep. of Germany ....... 3706957

[51] Int. Cl.⁴ .............................................. G06K 5/00
[52] U.S. Cl. ..................................................... 235/380
[58] Field of Search ............................................. 235/380

[56] References Cited

U.S. PATENT DOCUMENTS 4,295,039 10/1981 Stuckert .............................. 235/380

Primary Examiner—Harold I. Pitts

[57] ABSTRACT

A random number (v) generated in a customer chip card (KK) selects individual program parts (Pv) from the sensitive program data (P) for the data flow control, selecting these both in the customer card as well as in a customer terminal (KT). A respective authentication code (PACv) is formed from these program parts (Pv) with the assistance of an authentication algorithm (f) and of a secret cipher (KPC) and, finally, the authentication code (PACv) calculated in the customer chip card (KK) and the authentication code (PACv) calculated in the customer terminal (KT) are checked for identity in a comparison means (COMP) provided in the customer card (KK).

7 Claims, 1 Drawing Sheet

DATA EXCHANGE SYSTEM WITH AUTHENTICATION CODE COMPARATOR

BACKGROUND OF THE INVENTION

The invention is directed to a data exchange system employing a portable data carrier in the form of a chip card.

The protection of the data is playing an increasingly important part in modern data processing and communications systems. The quality of a system with respect to an adequate data protection is critically dependent upon the degree to which one succeeds in making access to the system possible only for authorized persons and, conversely, keeping unauthorized persons locked out with absolute certainty. A simple although not absolutely certain possibility for checking the access authorization to a system is to use passwords that are only known to the authorized user and which the user can change as often as he desires. Since there is the risk given passwords that unauthorized persons will find them out or hear them, additional protection measures are indispensible. One of these measures, for example, is the encoding and decoding of the transmitted information, a measure that is realizable in data processing systems, among other things, with the assistance of a chip card. With the increasing involvement of the chip card in data processing systems, however, an additional security risk again arises because chip cards can be relatively easily lost. Care must therefore be absolutely exercised to see that the chip card is protected against potential misuse in all instances when lost. The chip card is therefore designed such that the data stored in a protected chip card can only be accessed when the user previously inputs an identifier that is only stored in the chip card, for example, a personal identification number, referred to as a PIN.

A further security barrier can be erected with the assistance of the authentication of the chip card to the system. This authentication prevents an arbitrary subscriber from being authorized to access secret information in the system. A critical precondition for the authentication is a personal feature of the subscriber that cannot be copied. This non-copyable feature of the subscriber is achieved with the assistance of a secret cipher for the encoding and decoding that is known to the two partners, i.e. to the chip card on the one hand and to the system on the other hand, being known, namely, only to these two partners.

SUMMARY OF THE INVENTION

The close, circuit-oriented linkage between chip card and user terminal assumes that the user of the chip card not only documents his identity but also assumes that it is assured on the part of the terminal that the data flow in the terminal sequences is without manipulation. For example, the identification number PIN input by the chip card user cannot be read out, and the data indicated by the terminal likewise coincides with the data forwarded to the chip card. A manipulation of such a nature that supposedly true data are indicated to the user and that processing of the false data in the chip card must be impossible with absolute reliability.

It is therefore the object of the present invention to fashion a data system such that an unmanipulatable data flow control is guaranteed within the user terminal.

This object is achieved by the invention on the basis of an authentication code, calculated from a secret cipher and a random number. Advantageous developments of the invention are recited in the sub-claims. A system for generating a random number is shown, for example, in the copending application of Beutelspacher, et al. for "Circuit Arrangement For Protecting Access To A Data Processing System With The Assistance Of A Chip Card".

BRIEF DESCRIPTION OF THE DRAWINGS

The exemplary embodiments of the invention shall be set forth in greater detail below with reference to the drawing; in which.

DESCRIPTION OF THE PREFERRED EMBODIMENT

Figure 1:
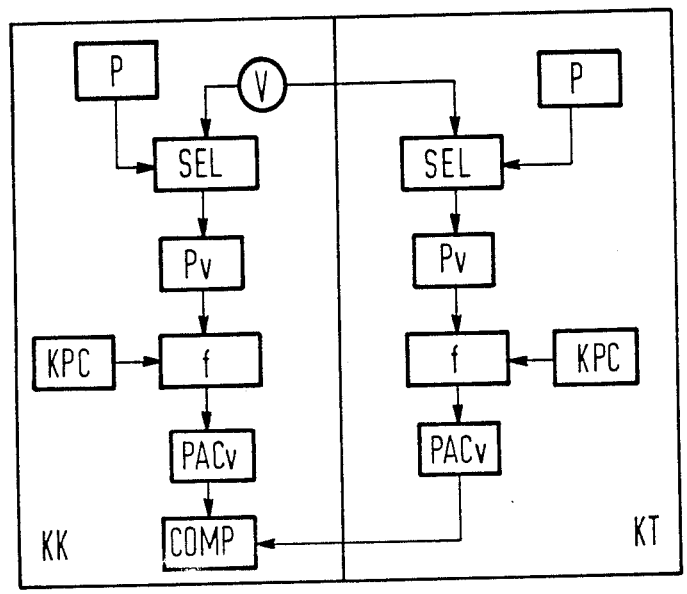
FIG. 1 is a circuit arrangement for checking the data flow in a data exchange system of the invention.

At the left, FIG. 1 shows a customer card KK fashioned as a chip card and, at the right thereof, a customer terminal KT in which the circuit components essential for explaining the invention are shown. When a proper program P for data flow control is situated in the customer terminal KT can be checked either by use of a customer card KK before inputting the personal identification number PIN, or by use of a test chip card, for instance upon the daily start-up of the terminal. This check is carried out with cryptographic methods. Required for this purpose is that the sensitive program parts P deposited in a memory of the customer terminal KT are deposited in the customer card or in a test card as reference data at the time of personalization of the card. A further prerequisite is that the protected storage of a secret cipher KPC is possible in the customer terminal KT. Further, both the customer card KK as well as the cutomer terminal KT have a shared authentication algorithm f at their disposal. An authentication parameter or, respectively, program authentication code PAC is then calculated with the assistance of this authentication algorithm f and of the secret cipher KPC from the program data both in the customer terminal KT and in the customer card KK. In order to prevent listening-in attacks and manipulations by learning the program authentication code PAC, a dynamic program check is executed with the assistance of a random number v. The random number v is generated in the customer card KK and is also forwarded to the customer terminal KT. Dependent on the random number v, a data block Pv is then selected with the assistance of the selection module SEL from the sensitive program parts P, both in the customer card KK and in the customer terminal KT. The afore-mentioned calculation of the program authentication code therefore ensues on the basis of this selected data block Pv according to the relationship $$PACv = f(KPC:Pv).$$

One of the two calculated program authentication codes PACv, namely that calculated in the customer terminal KT, is finally transmitted to the customer card KK, and the comparison means (COMP) provided therein determines whether the results calculated by the customer card KK and by the customer terminal KT agree.

Two possibilities are available for the protected storage of the secret cipher KPC deposited both in the customer card KK as well as in the customer terminal KT. One possibility is comprised in depositing the secret cipher KPC in a protected, programmable read-only memory. In the second possibility, the cipher KPC is read from a specific chip card into the write-read memory of the customer terminal via the card reader of the customer terminal KT. The power supply (not shown) for this memory may be external to the chip card.

A one-way function expediently comes into consideration as authentication algorithm f. At any rate, it should have so little complexity that it can be relatively easily implemented in a chip card.

A number of possibilities are conceivable for the selection of a data block Pv from the sensitive program data P with the assistance of the random number v. For example, every $K^{th}$ bit/byte can be selected from the program data P, whereby k is fixed and the random number v determines where the selection should be begun. Or, k=v applies and the start ensues with the first bit/byte of the program data P. However, the random number v, for example, can also initialize a further random number generator as a start value, with the output signals of this further random number generator determining the bits/bytes for the selected data block Pv.

The stored program part P can also be card-specific so that an excessive amount of memory capacity is not used in the customer card KK for storing the sensitive program data. Checking all of the sensitive program part P is nonetheless guaranteed on the basis of the totality of cards.

Figure 2:
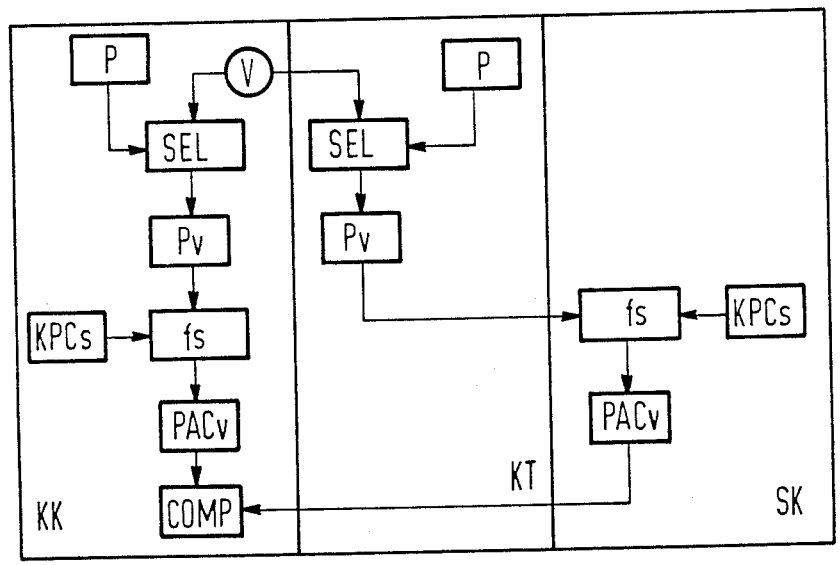
FIG. 2 is a modification of the circuit arrangement of FIG. 1.

Given use of different card systems in a terminal, the program check can be system-independently executed in that the program authentication code PAC is not checked in the customer terminal KT but in a separate security module, for example, in a specific security card SK (See FIG. 2) in a POS-terminal. Whether and in which way the program check is carried out is then left up to the card supplier. In particular, the authentication algorithm fs and the secret cipher KPCs are freely selectable by the supplier. A further advantage of this type of program check is the fact that no secret cipher need be stored in the area of the customer terminal KT.

It will be apparent that various modifications and/or additions may be made in the apparatus of the invention without departing from the essential features of novelty involved, which are intended to be defined and secured by the appended claims.

It is claimed

1. A data exchange system comprising at least one data input/data output means serving as a terminal KT and at least one portable data carrier in the form of a chip card, both said data input/data output means and said chip card having means for sending data to the other, both the data input/data output means and said chip card having an independent, programmable data memory with an associated control and address circuit, a stored program (P) for a microprocessor being stored in said data memory, for controlling data flow, a microprocessor for implementing a common athentication algorithm, in accordance with an identical, stored secret cipher, said chip card serving as customer card (KK) and containing a random number generator, means responsive to the output (v) of said random number generator for selecting parts of said program (P) from said data memory in said customer card (KK) and in said customer terminal (KT);
   means on said customer card for calculating an authentication code (PACv) from these program parts (Pv) with the assistance of an authentication algorithm (f) and using a secret cipher (KPC); and
   a comparison means (COMP) on said customer card (KK), for comparing the authentication code (PACv) calculated in the customer card (KK) and the authentication code (PACv) calculated in the customer terminal (KT) and transmitted into the customer card (KK) for identity.

2. The data exchange system according to claim 1, including means for transmitting the program parts (Pv) seleoted in the customer terminal (KT) into a separate security module in which the authentication code (PACv) is calculated with the assistance of the secret cipher (KPCs) and of the authentication algorithm (fs), and means for transmitting the calculated result directly to the comparison means (COMP) in said customer card (KK).

3. The data exchange system according to claim 2, wherein said security module is fashioned as a plug-in card (SK).

4. The data exchange system according to one of the preceding claims, characterized in that the selection of the data (Pv) from the program (P) for the data flow control operates to select every $k^{th}$ bit or byte of the program.

5. The data exchange system according to one of the preceding claims, characterized in that the selection of the program data (P) is controlled by a second random number generator that is initialized by the output signal of the first random number generator.

6. A method of authenticating a chip card when used in a data exchange system having at least one data input/output means serving as a terminal, said chip card having a random number generator, a microprocessor, and aprogrammable data memory for storing a secret cipher and a program of instructions for said microprocessor, said cipher and program also being stored in said terminal, comprising the steps of;
   storing an identical secret cipher in said chip card and in said terminal,
   selecting parts of said stored program, based on the output of said random number generator, from the stored program stored on said card and in said terminal,
   calculating an authentication code from said program parts, and
   comparing the authentication code calculated from program parts on said card and from program parts in said terminal to confirm identity of said stored programs.

7. The method of claim 6, including the steps of transmitting said program parts stored in said terminal into a separate security module for caloulating said authentication code and transmitting said authentication code to said card.

* * * * *